United States Patent
Ryu et al.

(10) Patent No.: US 11,117,803 B2
(45) Date of Patent: Sep. 14, 2021

(54) METHOD FOR MANUFACTURING MULTI-WALL CARBON NANOTUBES USING CONTINUOUS TYPE PROCESS

(71) Applicant: KOREA KUMHO PETROCHEMICAL CO., LTD., Seoul (KR)

(72) Inventors: Sang Hyo Ryu, Seoul (KR); Hyun Kyung Sung, Daejeon (KR); Chung Heon Jeong, Daejeon (KR); Dong Hwan Kim, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 76 days.

(21) Appl. No.: 16/490,772

(22) PCT Filed: Mar. 2, 2018

(86) PCT No.: PCT/KR2018/002548
§ 371 (c)(1),
(2) Date: Oct. 7, 2019

(87) PCT Pub. No.: WO2018/160041
PCT Pub. Date: Sep. 7, 2018

(65) Prior Publication Data
US 2020/0231443 A1 Jul. 23, 2020

(30) Foreign Application Priority Data

Mar. 3, 2017 (KR) .................. 10-2017-0027872
Feb. 28, 2018 (KR) .................. 10-2018-0024472

(51) Int. Cl.
*C01B 32/164* (2017.01)
*C01B 32/162* (2017.01)
*B01J 8/24* (2006.01)
*B01J 35/00* (2006.01)
(Continued)

(52) U.S. Cl.
CPC .............. *C01B 32/164* (2017.08); *B01J 8/24* (2013.01); *B01J 35/0026* (2013.01);
(Continued)

(58) Field of Classification Search
CPC . C01B 32/164; C01B 32/162; C01B 2202/06;
C01B 32/158; C01B 32/159;
(Continued)

(56) References Cited

U.S. PATENT DOCUMENTS

| 2008/0206125 A1 | 8/2008 | Silvy et al. |
| 2008/0274277 A1 | 11/2008 | Rashidi et al. |

(Continued)

FOREIGN PATENT DOCUMENTS

| JP | 2009-161426 A | 7/2009 |
| JP | 2009-528238 A | 8/2009 |

(Continued)

*Primary Examiner* — Daniel C. McCracken
(74) *Attorney, Agent, or Firm* — Novick, Kim & Lee, PLLC; Jae Youn Kim

(57) ABSTRACT

A method for manufacturing multi-wall carbon nanotubes, includes the steps of: (a) dissolving a metal precursor in a solvent to prepare a precursor solution; (b) perform thermal decomposition while spraying the precursor solution into a reactor, thereby forming a catalyst powder; and (c) introducing the catalyst powder into a fluidized-bed reactor heated to 600-900° C. and spraying a carbon-based gas and a carrier gas to synthesize multi-wall carbon nanotubes from the catalyst powder, wherein steps (a) to (c) are performed in a continuous type and wherein the catalyst powder contains metal components according to equation 1 below. <Equation 1> Ma:Mb=x:y, wherein Ma represents at least two metals selected from Fe, Ni, Co, Mn, Cr, Mo, V, W, Sn, and Cu; Mb represents at least one metal selected from Mg, Al, Si, and Zr; x and y each represent the molar ratio of Ma and Mb; and x+y=10, $2.0 \leq x \leq 7.5$, and $2.5 \leq y \leq 8.0$.

17 Claims, 2 Drawing Sheets

(51) Int. Cl.
*B82Y 30/00* (2011.01)
*B82Y 40/00* (2011.01)

(52) U.S. Cl.
CPC .............. *C01B 32/162* (2017.08); *B82Y 30/00* (2013.01); *B82Y 40/00* (2013.01)

(58) Field of Classification Search
CPC ..... C01B 32/16; C01B 32/166; C01B 32/168; C01B 32/17; C01B 32/172; C01B 32/174; C01B 32/176; C01B 32/178; C01B 2202/02; C01B 2202/04; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B01J 8/24; B01J 35/0026; B01J 23/8472; B01J 23/8872; B01J 23/882; B01J 23/8877; B01J 23/78; B82Y 30/00; B82Y 40/00; C01P 2006/10

See application file for complete search history.

(56) References Cited

U.S. PATENT DOCUMENTS

| | | | |
|---|---|---|---|
| 2010/0167053 A1* | 7/2010 | Sung ...................... | B01J 23/002 428/402 |
| 2010/0207053 A1* | 8/2010 | Ryu ...................... | C01B 32/162 252/71 |
| 2010/0230642 A1* | 9/2010 | Kim ........................ | C08J 5/005 252/511 |
| 2012/0040186 A1 | 2/2012 | Ryu et al. | |
| 2014/0087184 A1* | 3/2014 | Choi ................... | B01J 35/0013 428/367 |

FOREIGN PATENT DOCUMENTS

| | | |
|---|---|---|
| KR | 10-2012-0021581 A | 3/2012 |
| KR | 10-2013-0094364 A | 8/2013 |
| KR | 10-1303061 B1 | 9/2013 |
| KR | 10-1349674 B1 | 1/2014 |
| KR | 10-2015-0142993 A | 12/2015 |

* cited by examiner

METHOD FOR MANUFACTURING MULTI-WALL CARBON NANOTUBES USING CONTINUOUS TYPE PROCESS

TECHNICAL FIELD

The present invention relates to a method of preparing multi-walled carbon nanotubes using a continuous-type process.

BACKGROUND ART

Carbon nanotubes, which are tube-shaped materials having a hexagonal honeycomb pattern in which one carbon atom is bonded to three other carbon atoms, have excellent electrical, thermal, and mechanical properties compared to other materials and thus have been applied to various industrial fields.

Such carbon nanotubes are generally prepared by various methods such as arc-discharge, pyrolysis, laser vaporization, chemical vapor deposition, plasma chemical vapor deposition, thermal chemical vapor deposition, chemical vapor condensation, and the like.

Until now, catalysts for carbon nanotube preparation having various combinations of metal components and various physical properties have been developed. However, most of them were developed based on a fixed-bed chemical vapor deposition reactor which has low productivity and synthesizes carbon nanotubes with low uniformity, and thus are not suitable for a fluidized-bed chemical vapor deposition reactor which is advantageous for mass production and the preparation of carbon nanotubes with high uniformity.

In addition, there are also problems in that the catalysts are prepared by spray drying which is carried out at a low temperature of 200° C. to 350° C., the use of a water-soluble polymer as a pore-forming agent is essential for forming a hole in the catalysts, and it is required that a firing process is further carried out at a temperature of 350° C. to 1,100° C. in order to make the catalysts in a form suitable for synthesis, and a catalyst powder prepared by such spray drying has a high apparent density and thus is not suitable for a fluidized-bed reactor.

DISCLOSURE

Technical Problem

The present invention has been designed to solve the above-described problems of the prior art, and is directed to providing a method capable of realizing the mass production of multi-walled carbon nanotubes by improving the conversion rate of a carbon-based raw material gas and the yield of the multi-walled carbon nanotubes using a catalyst powder optimized for a fluidized-bed reactor.

Technical Solution

One aspect of the present invention provides a method of preparing multi-walled carbon nanotubes, the method including the steps of: (a) preparing a precursor solution by dissolving a metal precursor in a solvent; (b) forming a catalyst powder by subjecting the precursor solution to thermal decomposition while spraying the same into a reactor; and (c) synthesizing multi-walled carbon nanotubes from the catalyst powder by introducing the same into a fluidized-bed reactor heated to a temperature of 600° C. to 900° C. and spraying a carbon-based gas and a carrier gas to the same, wherein the steps (a) to (c) are carried out in a continuous manner, and the catalyst powder contains metal components according to the following Equation 1:

$$Ma:Mb = x:y \qquad \text{<Equation 1>}$$

In Equation 1, Ma represents two or more types of metals selected from among Fe, Ni, Co, Mn, Cr, Mo, V, W, Sn, and Cu, Mb represents one or more types of metals selected from among Mg, Al, Si, and Zr, x and y represent the mole fractions of Ma and Mb, respectively, and x+y=10, $2.0 \leq x \leq 7.5$, and $2.5 \leq y \leq 8.0$.

According to one embodiment, the catalyst powder may have a hollow structure with a thickness of 0.5 μm to 10 μm.

According to one embodiment, the catalyst powder may have an apparent density of 0.05 g/mL to 0.70 g/mL.

According to one embodiment, the hollow structure may have a hollow ratio of 50 vol % or more.

According to one embodiment, the conversion rate according to the following Equation 2 may be 80% or more.

$$\text{Conversion rate (\%)} = \{(\text{weight of multi-walled carbon nanotubes (g)}) - (\text{weight of catalyst powder (g)})\} / \{(\text{amount of supplied carbon-based gas (L)}) \times (\text{weight of carbon in one mole of carbon-based gas (g/mol)}) / (22.4(\text{L/mol}))\} \times 100 \qquad \text{<Equation 2>}$$

According to one embodiment, the carbon-based gas may be one selected from the group consisting of a saturated or unsaturated C1-C4 hydrocarbon, carbon monoxide, benzene, and a mixture of two or more thereof.

According to one embodiment, the carrier gas may be one selected from the group consisting of helium, nitrogen, argon, and a mixture of two or more thereof.

According to one embodiment, the metal precursor may be one selected from the group consisting of a metal nitrate, a metal sulfate, a metal alkoxide, a metal chloride, a metal acetate, a metal carbonate, and a mixture of two or more thereof.

According to one embodiment, the step (b) may include the steps of: (i) spraying a precursor solution into a reactor by supplying air of 2 atm to 5 atm as a carrier gas and introducing external air; and (ii) forming a catalyst powder by subjecting the precursor solution, which has been sprayed, to thermal decomposition at a temperature of 600° C. to 1,200° C.

According to one embodiment, the step (c) may include the steps of: (i) heating a fluidized-bed reactor to a temperature of 600° C. to 900° C.; (ii) supplying a catalyst powder through a top portion of the reactor and fluidizing the same in the reactor; (iii) supplying a carbon-based gas and a carrier gas through a bottom portion of the reactor using a rotary blade; and (iv) depositing, through thermal vapor deposition, carbon onto the catalyst powder, which has been fluidized by an ascending air current generated by the rotary blade.

According to one embodiment, after the step (c), a step (d) of collecting the multi-walled carbon nanotubes from the fluidized-bed reactor may be further carried out.

According to one embodiment, the step (d) may include the steps of: (i) transferring the multi-walled carbon nanotubes to a cyclone using nitrogen gas; and (ii) screening the multi-walled carbon nanotubes in the cyclone by removing impurities from the same.

According to one embodiment, the multi-walled carbon nanotubes may be present as a bundle-type carbon nanotube by forming an aggregate.

According to one embodiment, the bundle-type carbon nanotube may have an average bundle diameter of 0.5 μm to 20 μm and an average bundle length of 10 μm to 200 μm.

According to one embodiment, the multi-walled carbon nanotube may have an intensity ratio ($I_G/I_D$) of 0.7 to 1.5 as measured by Raman spectroscopy.

According to one embodiment, the multi-walled carbon nanotube may have an average diameter of 5 nm to 50 nm.

According to one embodiment, the multi-walled carbon nanotube may have an apparent density of 0.01 g/mL to 0.07 g/mL.

Advantageous Effects

According to one aspect of the present invention, since the preparation of a catalyst powder optimized for a fluidized-bed reactor by spray pyrolysis and the preparation of multi-walled carbon nanotubes in a fluidized-bed reactor using the catalyst powder are carried out in a continuous manner, it is possible to obtain a conversion rate of 80% or more and accordingly mass-produce multi-walled carbon nanotubes with high economic efficiency.

However, it is to be understood that the effects of the present invention are not limited to the above-described effects and include all effects deducible from the configuration of the invention described in the detailed description of the invention or in the claims.

MODES OF THE INVENTION

Figure 1:
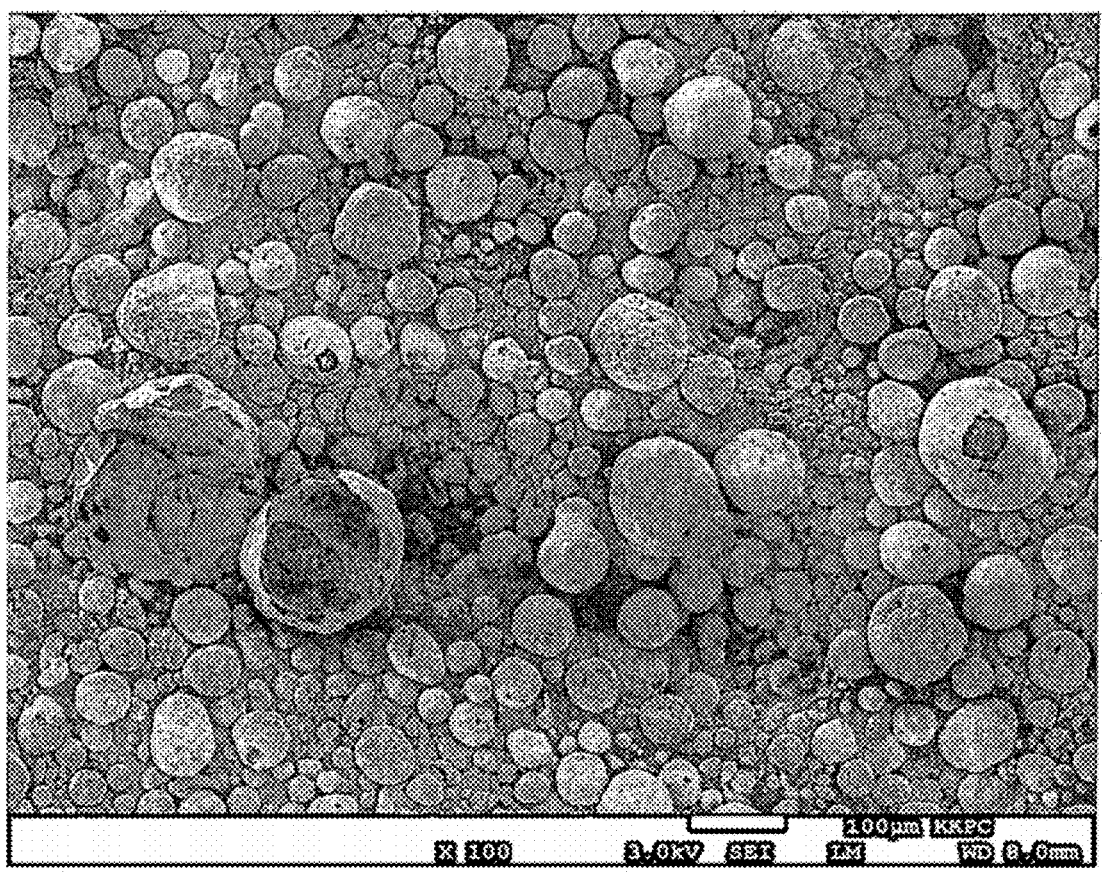
FIG. 1 is a scanning electron microscope (SEM) image of a catalyst for preparing multi-walled carbon nanotubes according to an Example of the present invention.

Hereinafter, the present invention will be described with reference to the accompanying drawings. However, it should be understood that the invention can be embodied in various forms and thus is not limited to the embodiments described herein. In addition, in order to clearly describe the invention, parts irrelevant to the description of the invention are omitted in the drawings, and like reference numerals designate like parts throughout the specification.

Throughout this specification, when a part is mentioned as being "connected" to another part, this means that the part may not only be "directly connected" to the other part but may also be "indirectly connected" to the other part through another member interposed therebetween. In addition, when a part is mentioned as "including" a specific component, this does not preclude the possibility of the presence of other component(s) in the part, which means that the part may further include the other component(s), unless otherwise stated.

One aspect of the present invention provides a method of preparing multi-walled carbon nanotubes, the method including the steps of: (a) preparing a precursor solution by dissolving a metal precursor in a solvent; (b) forming a catalyst powder by subjecting the precursor solution to thermal decomposition while spraying the same into a reactor; and (c) synthesizing multi-walled carbon nanotubes from the catalyst powder by introducing the same into a fluidized-bed reactor heated to a temperature of 600° C. to 900° C. and spraying a carbon-based gas and a carrier gas to the same, wherein the steps (a) to (c) are carried out in a continuous manner, and the catalyst powder contains metal components according to the following Equation 1:

$$Ma{:}Mb = x{:}y \qquad \text{<Equation 1>}$$

In Equation 1, Ma represents two or more types of metals selected from among Fe, Ni, Co, Mn, Cr, Mo, V, W, Sn, and Cu, Mb represents one or more types of metals selected from among Mg, Al, Si, and Zr, x and y represent the mole fractions of Ma and Mb, respectively, and x+y=10, $2.0 \leq x \leq 7.5$, and $2.5 \leq y \leq 8.0$.

In the step (a), a precursor solution for each of the metal elements constituting the catalyst powder may be prepared. The metal precursor may be one selected from the group consisting of a metal nitrate, a metal sulfate, a metal alkoxide, a metal chloride, a metal acetate, a metal carbonate, and a mixture of two or more thereof, but the present invention is not limited thereto.

In the step (a), the solvent may be a polar solvent, and as the polar solvent, water, methanol, ethanol, propanol, isopropanol, butanol, or a mixture of two or more thereof may be used, water is preferably used, and deionized water is more preferably used.

When dissolving each precursor for the preparation of the precursor solution, the use of deionized water as the solvent can minimize impurities in the precursor solution and accordingly improve the purity of the catalyst powder finally prepared. The improved purity of the catalyst powder may ultimately mean the improved purity of the carbon nanotubes.

In the step (b), a catalyst powder may be formed by subjecting the precursor solution to thermal decomposition while spraying the same into a reactor. The step (b) may include the steps of: (i) spraying a precursor solution into a reactor by supplying air of 2 atm to 5 atm as a carrier gas and introducing external air; and (ii) forming a catalyst powder by subjecting the precursor solution, which has been sprayed, to thermal decomposition at a temperature of 600° C. to 1,200° C.

In the step (i), in order to control the particle diameter, apparent density, and the like of the catalyst powder, the precursor solution may be converted into finer droplets by spraying the same into the reactor.

When spraying the precursor solution, the pressure may be adjusted within the range of 2 atm to 5 atm. When the spray pressure is less than 2 atm, since the particle diameter, apparent density, and the like of the catalyst powder cannot be adjusted within a predetermined range, the purity of the synthesized carbon nanotubes may be lowered. On the other hand, when the spray pressure is more than 5 atm, since the particle size of the droplets is excessively decreased, the obtained catalyst may form an aggregate.

As the surface tension of the precursor solution is overcome and the inertia force is more effectively transferred to the solution, the size of the droplets can be more precisely controlled, and accordingly, the particle diameter, apparent density, and the like of the catalyst powder can be more precisely controlled.

Accordingly, a gas may be sprayed at the same time as spraying the precursor solution to form droplets, or a gas may be sprayed after spraying the precursor solution to form droplets.

However, the size of droplets can be more precisely controlled when the precursor solution and gas are sequentially sprayed, and therefore, in the above-described method of preparing a catalyst powder, an additional step of spraying a gas into the reactor may be carried out before the step (ii).

In this case, as the gas, air, nitrogen, argon, or a mixed gas of two or more thereof may be used, and air is preferably used. Also, in addition to spraying the gas, electrostatic attraction may be further applied to improve the droplet formation efficiency.

In the case of further spraying a gas after spraying the precursor solution, the gas spray pressure may be adjusted within the range of 2 atm to 5 atm as in the case of spraying the gas and the precursor solution at the same time, and the effects of when the spray pressure is out of this range have been described above.

In the step (ii), a catalyst powder may be finally prepared by heating the droplets to evaporate the solvent and decompose the precursor. In this case, the temperature of the reactor may be 600° C. to 1,200° C. and preferably 700° C. to 900° C.

When the temperature of the reactor is less than 600° C., since the catalyst powder is poorly dried, there may be an economic disadvantage in that an additional process is required, and the purity or physical properties of the prepared carbon nanotubes may be adversely affected. On the other hand, when the temperature of the reactor is more than 1,200° C., not only economic loss may be caused because excessive costs are required to build equipment or a system, but also the performance of the catalyst may be degraded due to the formation of a solid solution or the deformation of the crystal structure.

In the step (c), the catalyst powder may be introduced into a fluidized-bed reactor which has been heated to a temperature of 600° C. to 900° C., and then multi-walled carbon nanotubes may be synthesized from the catalyst powder by spraying a carbon-based gas and a carrier gas to the same.

Specifically, the step (c) may include the steps of: (i) heating a fluidized-bed reactor to a temperature of 600° C. to 900° C.; (ii) supplying the catalyst powder through a top portion of the reactor and fluidizing the same in the reactor; (iii) supplying a carbon-based gas and a carrier gas through a bottom portion of the reactor using a rotary blade; and (iv) depositing, through thermal vapor deposition, carbon onto the catalyst powder, which has been fluidized by an ascending air current generated by the rotary blade.

The steps (a) to (c) may be carried out in a continuous manner, and in particular, since the preparation of a catalyst powder by spray pyrolysis in the steps (a) and (b) and the introduction of the catalyst powder into a fluidized-bed reactor for preparing carbon nanotubes are carried out in a continuous manner, it is possible to effectively prepare a large amount of carbon nanotubes.

The catalyst powder may be used in chemical vapor condensation for synthesizing carbon nanotubes, and since Ma is two or more types of metals selected from among Fe, Ni, Co, Mn, Cr, Mo, V, W, Sn, and Cu, and Mb is one or more types of metals selected from among Mg, Al, Si, and Zr, the catalyst powder may contain at least three types of metals and preferably three to five types of metal components.

In particular, Ma is a catalyst component and an active component in the catalyst powder, and since two or more types of metal components are used in combination, the generation of impurities during the synthesis of carbon nanotubes is suppressed, and thus purity can be improved compared to when only one metal component is used as the catalyst component and the active component.

As used herein, the term "catalyst component" refers to a material that substantially lowers the chemical reaction energy of a material, that is, a main catalyst, and the term "active component" refers to a material that assists the action of the catalyst component, that is, a cocatalyst. When the catalyst component and the active component are in a uniform distribution within a certain range, the synthesis yield of carbon nanotubes can be improved.

The relationship between x and y, which are the mole fractions of Ma and Mb, respectively, may satisfy $2.0 \leq x \leq 7.5$ and $2.5 \leq y \leq 8.0$. When x is less than 2.0, catalyst activity and accordingly the synthesis yield of carbon nanotubes may be lowered, and when x is more than 7.5, since the content of Mb, which is a support component, is relatively low, the durability of the catalyst powder is lowered, and therefore, there is a difficulty in applying the catalyst powder to the continuous-type fluidized-bed chemical vapor deposition method for the mass production of carbon nanotubes.

The catalyst powder may have a hollow structure with a thickness of 0.5 μm to 10 μm and preferably 1 μm to 8 μm, and the hollow ratio may be 50 vol % or more. In addition, the catalyst powder may have an apparent density of 0.05 g/mL to 0.70 g/mL.

As used herein, the term "hollow structure" refers to a three-dimensional structure with an empty interior, for example, a spherical or polyhedral structure with an empty interior, and may be interpreted as encompassing a closed structure having a completely closed hollow, an open structure having a partially open hollow, or a combination thereof.

In the case of a conventionally used catalyst powder, which is in the form of a solid sphere, there is a difficulty in applying the catalyst powder to the continuous-type fluidized-bed chemical vapor deposition method for the mass production of carbon nanotubes because of its high apparent density of greater than about 0.7 g/mL, and since the carbon nanotubes grow only on the outer surface of the catalyst powder, there is a difficulty in improving the yield to or above a certain level.

On the other hand, since the catalyst powder has a low apparent density compared to a conventional catalyst powder due to having a hollow structure, it can be applied to the continuous-type fluidized-bed chemical vapor deposition method, and since the carbon nanotubes can grow not only in an outward direction from the outer surface of the hollow structure but also in an inward direction from the inner surface of the hollow structure, the synthesis yield of carbon nanotubes can be significantly improved.

Specifically, the conversion rate of the carbon-based gas according to the following Equation 2 may be 80% or more.

Conversion rate (%)={(weight of multi-walled carbon nanotubes (g))−(weight of catalyst powder (g))}/{(amount of supplied carbon-based gas (L))×(weight of carbon in one mole of carbon-based gas (g/mol))/(22.4(L/mol))}×100  <Equation 2>

The carbon-based gas may be, for example, one selected from the group consisting of a saturated or unsaturated C1-C4 hydrocarbon, carbon monoxide, benzene, and a mixture of two or more thereof, and is preferably ethylene gas, but the present invention is not limited thereto. In addition, the carrier gas may be, for example, one selected from the group consisting of helium, nitrogen, argon, and a mixture of two or more thereof, and is preferably nitrogen, but the present invention is not limited thereto.

After the step (c), a step (d) of collecting the multi-walled carbon nanotubes from the fluidized-bed reactor may be further carried out. The step (d) may include the steps of: (i) transferring the multi-walled carbon nanotubes to a cyclone using nitrogen gas; and (ii) screening the multi-walled carbon nanotubes in the cyclone by removing impurities from the same.

As used herein, the term "cyclone" refers to a device for separating impurities contained in a specific mixture, which uses the principle that when a mixture containing impurities is allowed to flow in a tangential direction with respect to an upper circumference of a conical device, a high-speed swirl flow is generated to cause the impurities in the mixture, which lose their kinetic energy while colliding with the wall, to be discharged through a bottom portion of the device and removed and the mixture from which the impurities have been removed to be discharged through a top portion. That is, carbon nanotube aggregates, which are types of impurities, are discharged through a bottom portion of the cyclone and removed, and purified multi-walled carbon nanotubes are discharged through a top portion of the cyclone and passed through a packaging device provided at a rear end thereof, and thereby a product with high purity and high uniformity can be obtained.

The multi-walled carbon nanotubes may be present as a bundle-type carbon nanotube by forming an aggregate. Basically, the bundle-type carbon nanotube may be present in the form of an aggregate formed of a plurality of carbon nanotubes and preferably an aggregate formed of a plurality of multi-walled carbon nanotubes. Each of the carbon nanotubes and an aggregate thereof may be of a straight-type, a curved-type, or a combination of a straight-type and a curved-type.

The bundle-type carbon nanotube may have an average bundle diameter of 0.5 μm to 20 μm and an average bundle length of 10 μm to 200 μm. In addition, the multi-walled carbon nanotube may have an intensity ratio ($I_G/I_D$) of 0.7 to 1.5 as measured by Raman spectroscopy, an average diameter of 5 nm to 50 nm, and an apparent density of 0.01 g/mL to 0.07 g/mL.

Hereinafter, Examples of the present invention will be described in detail.

EXAMPLES

A precursor solution was prepared by dissolving each precursor among $Fe(NO_3)_3 \cdot 9H_2O$, $Co(NO_3)_2 \cdot 6H_2O$, $(NH_4)_6Mo_7O_{24} \cdot 4H_2O$, $NH_4VO_3$, $(NH_4)_{10}H_2(W_2O_7)_6 \cdot 9H_2O$, $Al(NO_3)_3 \cdot 9H_2O$, $Mg(NO_3)_2 \cdot 6H_2O$, and $ZrO(NO_3)_2 \cdot 2H_2O$ in deionized water, which is required for a catalyst composition shown in the following Table 1. A catalyst powder was obtained by subjecting the precursor solution to thermal decomposition by spraying the same into a reactor at a rate of 3 L/hr along with air. Here, the thermal decomposition was carried out continuously for 120 minutes under conditions of an air pressure of 3 atm and a reactor internal temperature of 750° C.

TABLE 1

| Classification | Catalyst composition | Ma (number of moles) | | | | | Mb (number of moles) | | | Ma in total | Mb in total | x (mole fraction) | y (mole fraction) |
|---|---|---|---|---|---|---|---|---|---|---|---|---|---|
| | | Fe | Co | Mo | V | W | Al | Mg | Zr | | | | |
| Example 1 | Fe/Al/Mg | 71.6 | — | — | — | — | 148.2 | 82.3 | — | 71.6 | 230.5 | 2.37 | 7.63 |
| Example 2 | Fe/Mo/Al/Mg | 88.6 | — | 5.2 | — | — | 183.5 | 4.1 | — | 93.8 | 187.6 | 3.33 | 6.67 |
| Example 3 | Co/V/Al/Mg | — | 118.8 | — | 9.8 | — | 148.2 | 41.1 | — | 128.6 | 189.4 | 4.04 | 5.96 |
| Example 4 | Fe/Co/Mo/Al | 47.0 | 14.8 | 5.2 | — | — | 185.3 | — | — | 67.1 | 185.3 | 2.66 | 7.34 |
| Example 5 | Fe/Co/Mo/Al | 67.1 | 21.2 | 5.2 | — | — | 185.3 | — | — | 93.6 | 185.3 | 3.36 | 6.64 |
| Example 6 | Fe/Co/Mo/Al | 94.0 | 29.7 | 5.2 | — | — | 185.3 | — | — | 128.9 | 185.3 | 4.10 | 5.90 |
| Example 7 | Fe/Co/Mo/Al/Mg | 67.1 | 21.2 | 5.2 | — | — | 185.3 | 4.1 | — | 93.6 | 189.4 | 3.31 | 6.69 |
| Example 8 | Fe/Co/Mo/V/Al | 134.3 | 42.4 | 5.2 | 0.6 | — | 185.3 | — | — | 182.5 | 185.3 | 4.96 | 5.04 |
| Example 9 | Co/V/W/Al | — | 118.8 | — | 9.8 | 8.2 | 148.2 | — | — | 136.8 | 148.2 | 4.80 | 5.20 |
| Example 10 | Co/V/Al/Zr | — | 237.6 | — | 17.7 | — | 74.1 | — | 21.9 | 255.2 | 96.0 | 7.27 | 2.73 |
| Comparative Example 1 | Fe/Al/Mg | 53.7 | — | — | — | — | 148.2 | 82.3 | — | 53.7 | 230.5 | 1.89 | 8.11 |
| Comparative Example 2 | Fe/Co/Mo/Al | 143.2 | 67.9 | 20.8 | — | — | 74.1 | — | — | 231.9 | 74.1 | 7.58 | 2.42 |
| Comparative Example 3 | Fe/Co/Mo | 67.1 | 21.2 | 5.2 | — | — | — | — | — | 93.6 | 0.0 | 10.00 | 0.00 |
| Comparative Example 4 | Al/Mg | — | — | — | — | — | 74.1 | 41.1 | — | 0.0 | 115.3 | 0.00 | 10.00 |
| Comparative Example 5 | Fe/Co/Mo/Al | 67.1 | 21.2 | 5.2 | — | — | 185.3 | — | — | 93.6 | 185.3 | 3.36 | 6.64 |
| Comparative Example 6 | Fe/Co/Mo/Al | 67.1 | 21.2 | 5.2 | — | — | 185.3 | — | — | 93.6 | 185.3 | 3.36 | 6.64 |
| Comparative Example 7 | Fe/Co/Mo/Al | 67.1 | 21.2 | 5.2 | — | — | 185.3 | — | — | 93.6 | 185.3 | 3.36 | 6.64 |
| Comparative Example 8 | Fe/Co/Mo/Al | 67.1 | 21.2 | 5.2 | — | — | 185.3 | — | — | 93.6 | 185.3 | 3.36 | 6.64 |

Figure 2:
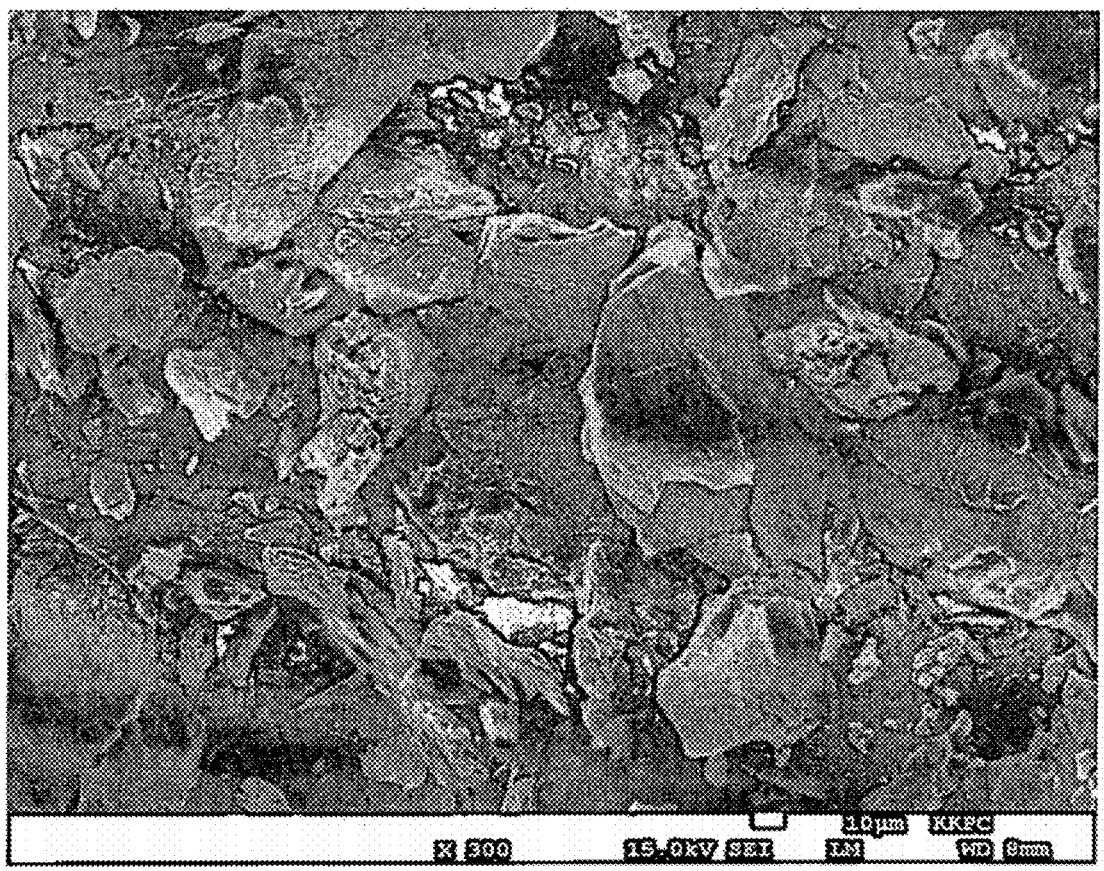
FIG. 2 is an SEM image of a catalyst for preparing multi-walled carbon nanotubes according to a Comparative Example of the present invention.

The catalysts according to Comparative Example 5 and Example 5 had the same components and compositions but were prepared by different methods, wherein the catalyst according to Comparative Example 5 was prepared by spray drying. Specifically, in the case of Comparative Example 5, to prepare a catalyst powder in the form of a solid sphere, a catalyst powder was prepared by spraying a precursor solution into a reactor of 200° C., which is significantly lower than the temperature of spray pyrolysis used for Example 5, and then subjected to heat treatment in a heat-treatment furnace under an air atmosphere for one hour at 700° C. The catalysts according to Comparative Examples 6 and 7, which were prepared by co-precipitation and combustion, respectively, have a plate shape as shown in FIG. 2. The catalyst according to Comparative Example 8 is a catalyst prepared using a completely water-insoluble alumina ($Al_2O_3$) powder as the precursor of Al among the catalyst components.

Carbon nanotubes were synthesized using the catalyst powder. Specifically, each type of catalyst powder was introduced into a fluidized-bed chemical vapor deposition reactor having a diameter of 350 mm, and the temperature was raised to a temperature of 700° C. to 800° C. under a nitrogen atmosphere and maintained. Subsequently, a mixed gas of nitrogen and ethylene was allowed to react therewith for 40 minutes while supplying the same at a rate of 150 L/min, and thereby carbon nanotubes grown on each type of catalyst powder were synthesized.

Experimental Example

The apparent density of each type of catalyst powder was calculated by dividing the weight of the catalyst powder, which was measured by filling a mass cylinder with the same, by the volume of the mass cylinder, and the apparent density of carbon nanotubes was determined in the same manner. In addition, the synthesis yield of carbon nanotubes was calculated according to the equation: "[weight of synthesized carbon nanotubes (g)]/[weight of introduced catalyst powder (g)]×100," and the conversion rate of ethylene was calculated according to the equation: "{(weight of multi-walled carbon nanotubes (g))−(weight of catalyst powder (g))}/{(amount of supplied carbon-based gas (L))×(weight of carbon in one mole of carbon-based gas (g/mol))/(22.4 (L/mol))}×100." The results are shown in the following Table 2.

TABLE 2

| Classification | Apparent density of catalyst powder (g/mL) | Synthesis yield of carbon nanotubes (%) | Conversion rate of ethylene gas (%) | Apparent density of carbon nanotubes (g/mL) |
|---|---|---|---|---|
| Example 1 | 0.180 | 1,264 | 85.7 | 0.015 |
| Example 2 | 0.060 | 1,490 | 90.1 | 0.022 |
| Example 3 | 0.516 | 1,400 | 89.7 | 0.020 |
| Example 4 | 0.077 | 1,354 | 91.2 | 0.020 |
| Example 5 | 0.072 | 1,437 | 93.5 | 0.022 |
| Example 6 | 0.084 | 2,600 | 83.6 | 0.023 |
| Example 7 | 0.090 | 1,392 | 91.4 | 0.015 |
| Example 8 | 0.215 | 4,282 | 93.5 | 0.027 |
| Example 9 | 0.369 | 3,855 | 96.2 | 0.031 |
| Example 10 | 0.662 | 4,030 | 95.6 | 0.034 |
| Comparative Example 1 | 0.164 | 651 | 68.5 | 0.008 |
| Comparative Example 2 | 0.470 | 967 | 78.6 | 0.029 |
| Comparative Example 3 | 0.437 | 826 | 74.8 | 0.076 |
| Comparative Example 4 | 0.906 | 0 | 0 | — |
| Comparative Example 5 | 0.815 | 763 | 72.3 | 0.053 |
| Comparative Example 6 | 0.726 | 582 | 61.3 | 0.013 |
| Comparative Example 7 | 0.028 | 594 | 59.8 | 0.007 |
| Comparative Example 8 | 1.056 | 742 | 75.2 | 0.012 |

Referring to Table 2, it can be seen that the synthesis of carbon nanotubes in a fluidized-bed chemical vapor deposition reactor using a catalyst according to Examples 1 to 10 can realize a high synthesis yield of 1,200% or more and thus is suitable for the mass production of carbon nanotubes. However, it can be seen that the use of a catalyst according to a Comparative Example is not suitable for mass production because a carbon nanotube synthesis yield of less than 1,000% is obtained, and thus the catalysts according to the Comparative Examples are not a type suitable for a fluidized-bed chemical vapor deposition reactor. In particular, in the case of the catalysts according to Comparative Examples 4, 5, 6, and 8, where the catalyst powder has an apparent density of 0.70 g/mL or more, there is a difficulty in causing the catalyst to float by the fluidized-bed chemical vapor deposition method in which carbon nanotubes are synthesized while a catalyst powder is caused to float by a reaction gas.

In addition, it can be seen that a catalyst according to a Comparative Example is also very disadvantageous in terms of production costs because, due to a low synthesis yield and the fluidization of the catalyst powder, the conversion rate of the ethylene gas used for synthesizing carbon nanotubes is less than 80% in all of the Comparative Examples, and therefore, when a catalyst according to a Comparative Example is used for mass production, a larger amount of ethylene gas should be introduced to prepare the same amount of carbon nanotubes.

The foregoing description of the present invention is intended for illustration, and it will be understood by those skilled in the art to which the invention pertains that the invention can be easily modified and implemented in various other forms without changing the technical spirit or essential features of the invention. Therefore, it should be understood that the embodiments described above are only exemplary in all aspects and not limiting. For example, each of the constituents described as being one combined entity may be implemented separately, and similarly, constituents described as being separate entities may be implemented in a combined form.

It should be understood that the scope of the present invention is defined by the following claims and that all changes or modifications derived from the meaning and scope of the claims and their equivalents are included in the scope of the invention.

The invention claimed is:

1. A method of preparing multi-walled carbon nanotubes, the method comprising:
   (a) preparing a precursor solution by dissolving a metal precursor in a solvent;
   (b) forming a catalyst powder by subjecting the precursor solution to thermal decomposition while spraying the precursor solution into a reactor; and
   (c) synthesizing multi-walled carbon nanotubes from the catalyst powder by introducing the catalyst powder into a fluidized-bed reactor heated to a temperature of 600° C. to 900° C. and spraying a carbon-based gas and a carrier gas to the catalyst powder,
   wherein (a) to (c) are carried out in a continuous manner, and the catalyst powder contains metal components according to the following Equation 1:

$$Ma:Mb=x:y \qquad \text{<Equation 1>}$$

wherein, in Equation 1:
   Ma represents two or more types of metals selected from among Fe, Ni, Co, Mn, Cr, Mo, V, W, Sn, and Cu;
   Mb represents one or more types of metals selected from among Mg, Al, Si, and Zr;
   x and y represent the mole fractions of Ma and Mb, respectively; and $x+y=10$, $2.0 \leq x \leq 7.5$, and $2.5 \leq y \leq 8.0$.

2. The method of claim 1, wherein the catalyst powder has a hollow structure with a thickness of 0.5 µm to 10 µm.

3. The method of claim 1, wherein the catalyst powder has an apparent density of 0.05 g/mL to 0.70 g/mL.

4. The method of claim 2, wherein the hollow structure has a hollow ratio of 50 vol % or more.

5. The method of claim 1, wherein a conversion rate according to the following Equation 2 is 80% or more:

Conversion rate (%)={(weight of multi-walled carbon nanotubes (g))−(weight of catalyst powder (g))}/{(amount of supplied carbon-based gas (L))×(weight of carbon in one mole of carbon-based gas (g/mol))/(22.4(L/mol))}×100.   <Equation 2>

6. The method of claim 1, wherein the carbon-based gas is one selected from the group consisting of a saturated or unsaturated C1-C4 hydrocarbon, carbon monoxide, benzene, and a mixture of two or more thereof.

7. The method of claim 1, wherein the carrier gas is one selected from the group consisting of helium, nitrogen, argon, and a mixture of two or more thereof.

8. The method of claim 1, wherein the metal precursor is one selected from the group consisting of a metal nitrate, a metal sulfate, a metal alkoxide, a metal chloride, a metal acetate, a metal carbonate, and a mixture of two or more thereof.

9. The method of claim 1, wherein (b) includes:
(i) spraying the precursor solution into the reactor by supplying air of 2 atm to 5 atm as the carrier gas and introducing external air; and
(ii) forming the catalyst powder by subjecting the precursor solution, which has been sprayed, to thermal decomposition at a temperature of 600° C. to 1,200° C.

10. The method of claim 1, wherein (c) includes:
(i) supplying the catalyst powder through a top portion of the reactor and fluidizing the same in the reactor;
(ii) supplying a carbon-based gas and a carrier gas through a bottom portion of the reactor using a rotary blade; and
(iii) depositing, through thermal vapor deposition, carbon onto the catalyst powder, which has been fluidized by an ascending air current generated by the rotary blade.

11. The method of claim 1, further comprising, after (c), (d) collecting the multi-walled carbon nanotubes from the fluidized-bed reactor.

12. The method of claim 11, wherein (d) includes:
(i) transferring the multi-walled carbon nanotubes to a cyclone using nitrogen gas; and
(ii) screening the multi-walled carbon nanotubes in the cyclone by removing impurities from the same.

13. The method of claim 1, wherein the multi-walled carbon nanotubes are present as a bundle-type carbon nanotube by forming an aggregate.

14. The method of claim 13, wherein the bundle-type carbon nanotube has an average bundle diameter of 0.5 μm to 20 μm and an average bundle length of 10 μm to 200 μm.

15. The method of claim 1, wherein the multi-walled carbon nanotubes respectively have an intensity ratio ($I_G/I_D$) of 0.7 to 1.5 as measured by Raman spectroscopy.

16. The method of claim 1, wherein the multi-walled carbon nanotubes respectively have an average diameter of 5 nm to 50 nm.

17. The method of claim 1, wherein the multi-walled carbon nanotubes respectively have an apparent density of 0.01 g/mL to 0.07 g/mL.

* * * * *